United States Patent
Kauchi et al.

(10) Patent No.: US 8,995,601 B2
(45) Date of Patent: Mar. 31, 2015

(54) AXIAL POWER DISTRIBUTION PREDICTION METHOD AND AXIAL POWER DISTRIBUTION PREDICTION DEVICE

(75) Inventors: Masayuki Kauchi, Tokyo (JP); Masatoshi Nagai, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 775 days.

(21) Appl. No.: 13/202,236

(22) PCT Filed: Feb. 18, 2010

(86) PCT No.: PCT/JP2010/052473
§ 371 (c)(1),
(2), (4) Date: Oct. 25, 2011

(87) PCT Pub. No.: WO2010/095695
PCT Pub. Date: Aug. 26, 2010

(65) Prior Publication Data
US 2012/0033778 A1 Feb. 9, 2012

(30) Foreign Application Priority Data
Feb. 20, 2009 (JP) .................................. 2009-038137

(51) Int. Cl.
*G21C 7/36* (2006.01)
*G21D 3/00* (2006.01)
(Continued)

(52) U.S. Cl.
CPC *G21D 3/001* (2013.01); *G21C 7/00* (2013.01); *G21C 17/00* (2013.01); *Y02E 30/39* (2013.01)
USPC ........... 376/218; 376/207; 376/215; 376/216; 376/217; 376/245

(58) Field of Classification Search
CPC ............ G21D 3/00; G21D 3/001; G21D 3/04; G21D 3/08; G21D 3/10; G21D 3/18; G21D 2003/00; G21D 2003/01
USPC ........................................ 376/207, 218, 245
See application file for complete search history.

(56) References Cited

U.S. PATENT DOCUMENTS 4,774,050 A * 9/1988 Impink, Jr. .................... 376/245
2010/0142666 A1* 6/2010 Shimazu ....................... 376/218

FOREIGN PATENT DOCUMENTS

| JP | 7-104092 A | 4/1995 |
| JP | 2000-121779 A | 4/2000 |

(Continued)

OTHER PUBLICATIONS

Shimazu, Yoichiro et al. "Monitoring and Control of Radial Xenon Oscillation in PWRs by a Three-Radial-Offset Concept," Journal of Nuclear Science and Technology, 2007, vol. 44 No. 2, pp. 155-162.*

(Continued)

*Primary Examiner* — Jack W Keith
*Assistant Examiner* — Marshall O'Connor
(74) *Attorney, Agent, or Firm* — Westerman, Hattori, Daniels & Adrian, LLP (57) ABSTRACT

An axial power distribution control device includes an axial offset calculation unit 52, a parameter calculation unit 53, and an axial offset determining unit 55. The axial offset determining unit 55 predicts whether a core axial offset of the power distribution is increased or decreased after a current time, based on a major axis of an ellipse drawn by the xenon parameter and the iodine parameter calculated by the parameter calculation unit 53 and the xenon parameter and the iodine parameter at the current time. This makes it possible to predict a change of the axial offset of the power distribution of a reactor for suppressing a xenon oscillation in the reactor.

3 Claims, 6 Drawing Sheets

(51) Int. Cl.
*G21C 7/00* (2006.01)
*G21C 17/00* (2006.01)

(56) References Cited

FOREIGN PATENT DOCUMENTS

| JP | 3202430 | B2 | | 8/2001 |
|---|---|---|---|---|
| JP | 2008281447 | A | * | 11/2008 |
| WO | 2008/139933 | A1 | | 11/2008 |

OTHER PUBLICATIONS

International Search Report for PCT/JP2010/052473, mailing date of Mar. 16, 2010.

Shoichiro Shimada et al., "Load Follow Operation in PWRs" The Thermal and Nuclear Power, Feb. 1980, vol. 31, No. 2, pp. 135-150 (with English Translation).(cited in Specification).

Yoichiro Shimazu, "Modification of the Axial Offsets Trajectory Method to Control Xenon Oscillation during Load Following Operations", Journal of the Atomic Energy Society of Japan (1996), vol. 38, No. 1, pp. 54-58 (with English Translation).(cited in Specification).

Yoichiro Shimazu et al. "Optimal Control of axial xenon oscillation in PWR based on on-line data processing of axial offsets", Journal of The Atomic Energy Society of Japan (1991), vol. 33, No. 3, pp. 280-285 (with English Translation).(cited in Specification).

International Search Report of PCT/JP2010/052473, mailing date Mar. 16, 2010.

Written Opinion of PCT/JP2010/052473, mailing date Mar. 16, 2010.

* cited by examiner

AXIAL POWER DISTRIBUTION PREDICTION METHOD AND AXIAL POWER DISTRIBUTION PREDICTION DEVICE

FIELD

The present invention relates to a technique of controlling an axial power distribution of a nuclear reactor, and more particularly relates to a technique of preventing a xenon oscillation that can be generated in a pressurized water reactor.

BACKGROUND

It is widely known that a xenon oscillation could occur in the pressurized water reactor (PWR). The xenon oscillation is observed in the form of spatial oscillation of power distributions due to variations in spatial xenon concentration distribution. Xenon is a fission product from nuclear fission and has a high neutron absorption capability.

Xenon oscillation involves significant power distribution distortion in a nuclear reactor and may cause excessive local power, resulting in the local temperature rises. In order to ensure the safety of the core, xenon oscillation must be suppressed within a range of safe plant operation.

One of the technologies for preventing the above-mentioned excessive distortion of power distribution is known as "Power Distribution Control Method" for keeping axial power distribution within a prescribed range. For example, the Constant Axial Offset Control Method controls an axial offset (AO) within an allowable range which is determined based on the target-AO. Where, the AO is defined as a fraction of the power difference in the upper and lower halves of the core, and the target-AO is defined as the AO at which the core power is stable with control rods being almost totally withdrawn. In operation, it is monitored whether AO (or a value calculated by multiplying AO by the relative power when the core is at partial power) is within the allowable range, and if AO is out of the allowable range, the control rods can immediately guide AO back to the allowable range (Patent Document 1, Non-Patent Document 1).

In addition, this inventor also invented a xenon oscillation control method described in Japanese Patent No. 3202430 (Patent Document 2, Non-Patent Document 2, Non-Patent Document 3). The xenon oscillation control method employs an axial offset of the current power distribution ($AO_P$) in a nuclear reactor core, an axial offset of the power distribution which would give the current xenon distribution under equilibrium condition (xenon-corresponding axial offset of the current power distribution: $AO_X$) and an axial offset of the power distribution which would give the current iodine distribution under equilibrium condition (iodine-corresponding axial offset of the current power distribution: $AO_I$). Xenon oscillation can be suppressed by inserting or withdrawing control rods, so as to guide a trajectory to plot a parameter $DAO_{PX}(=AO_P-AO_X)$ on X axis and a parameter $DAO_{IX}(=AO_I-AO_X)$ on Y axis, to the origin of the coordinates.

CITATION LIST

Patent Literatures

Patent Literature 1: Japanese Patent Application Laid-open No. 2000-121779

Patent Literature 2: Japanese Patent Publication No. 3202430

Non Patent Literatures

Non Patent Literature 1: "Load-following operation of PWR", The Thermal and Nuclear Power, Vol. 31, No. 2.

Non Patent Literature 2: "Optimum control method for axial-direction xenon oscillation of PWR based on online data processing of axial offset of the power distribution", Journal of The Atomic Energy Society of Japan, Vol. 33, No. 3.

Non Patent Literature 3: "Improvement on axial-offset trajectory method for xenon oscillation control in load-following operation", Journal of The Atomic Energy Society of Japan, Vol. 38, No. 1.

SUMMARY

Technical Problem

When a xenon oscillation occurs, the axial offset of the power distribution of the reactor is increased or decreased in synchronization with the xenon oscillation. Therefore, for example, even when the axial offset of the power distribution of the reactor approaches the allowable range, if it is a period during which the axial offset of the power distribution of the reactor is decreased, the axial offset of the power distribution of the reactor never exceeds the allowable range even without an operation of the control rod, thereby avoiding an unnecessary operation of the control rod. This requires a capability of predicting a change of the axial offset of the power distribution of the reactor. The present invention has been achieved in view of the above aspect, and the objective of the present invention is to predict a change of an axial offset of the power distribution of a reactor for suppressing a xenon oscillation in the reactor.

Solution to Problem

According to an aspect of the present invention, an axial power distribution prediction method includes: an axial offset calculation step of calculating an axial offset of the current power distribution, an axial offset of the power distribution which would give the current xenon distribution under equilibrium condition, and an axial offset of the power distribution which would give the current iodine distribution under equilibrium condition, using the following expressions (1) to (3) or (1)' to (3)', respectively, based on a relative power ($P_T$) in the upper half of the nuclear reactor core and a relative power ($P_B$) in the lower half of the nuclear reactor core; a parameter calculating step of calculating a xenon parameter represented by using a difference between the axial offset of the current power distribution and xenon-corresponding axial offset of the current power distribution during an operation of the reactor and an iodine parameter represented by using a difference between the iodine-corresponding axial offset of the current power distribution and the xenon-corresponding axial offset of the current power distribution during the operation of the reactor; and an axial offset determining step of predicting whether a core axial offset of the power distribution after a current time is increased or decreased, based on a major axis of an ellipse, drawn by the xenon parameter and the iodine parameter calculated by the parameter calculating step, and a xenon parameter and an iodine parameter at the current time.

Core axial offset of the current power distribution:

$$(P_T-P_B) \qquad \text{Expression (1)}$$

Xenon-corresponding core axial offset of the power distribution:

$$(P_{TX}-P_{BX}) \qquad \text{Expression (2)}$$

Iodine-corresponding core axial offset of the power distribution:

$$(P_{TI}-P_{BI}) \quad \text{Expression (3)}$$

Core axial offset of the current power distribution:

$$(P_T-P_B)/(P_T+P_B) \quad \text{Expression (1)'}$$

Xenon-corresponding core axial offset of the power distribution:

$$(P_{TX}-P_{BX})/(P_{TX}+P_{BX}) \quad \text{Expression (2)'}$$

Iodine-corresponding core axial offset of the power distribution:

$$(P_{TI}-P_{BI})/(P_{TI}+P_{BI}) \quad \text{Expression (3)', where}$$

$P_{TX}$: relative power in the upper half of the core that would give the current xenon concentration under equilibrium condition, $P_{BX}$: relative power in the lower half of the core that would give the current xenon concentration under equilibrium condition, $P_{TI}$: relative power in the upper half of the core that would give the current iodine concentration under equilibrium condition, and $P_{BI}$: relative power in the lower half of the core that would give the current iodine concentration under equilibrium condition.

According to another aspect of the present invention, an axial power distribution prediction device includes: an axial offset calculation unit of calculating an axial offset of the current power distribution, an axial offset of the power distribution which would give the current xenon distribution under equilibrium condition, and an axial offset of the power distribution which would give the current iodine distribution under equilibrium condition, using the following expressions (1) to (3) or (1)' to (3)', respectively, based on a relative power ($P_T$) in the upper half of the nuclear reactor core and a relative power ($P_B$) in the lower half of the nuclear reactor core; a parameter calculating unit of calculating a xenon parameter represented by using a difference between the axial offset of the current power distribution and xenon-corresponding axial offset of the current power distribution during an operation of the reactor and an iodine parameter represented by using a difference between the iodine-corresponding axial offset of the current power distribution and the xenon-corresponding axial offset of the current power distribution during the operation of the reactor; and an axial offset determining unit of predicting whether a core axial offset of the power distribution after a current time is increased or decreased, based on a major axis of an ellipse, drawn by the xenon parameter and the iodine parameter calculated by the parameter calculating unit, and a xenon parameter and an iodine parameter at the current time.

Core axial offset of the current power distribution:

$$(P_T-P_B) \quad \text{Expression (1)}$$

Xenon-corresponding core axial offset of the power distribution:

$$(P_{TX}-P_{BX}) \quad \text{Expression (2)}$$

Iodine-corresponding core axial offset of the power distribution:

$$(P_{TI}-P_{BI}) \quad \text{Expression (3)}$$

Core axial offset of the current power distribution:

$$(P_T-P_B)/(P_T+P_B) \quad \text{Expression (1)'}$$

Xenon-corresponding core axial offset of the power distribution:

$$(P_{TX}-P_{BX})/(P_{TX}+P_{BX}) \quad \text{Expression (2)'}$$

Iodine-corresponding core axial offset of the power distribution:

$$(P_{TI}-P_{BI})/(P_{TI}+P_{BI}) \quad \text{Expression (3)', where}$$

$P_{TX}$: relative power in the upper half of the core that would give the current xenon concentration under equilibrium condition, $P_{BX}$: relative power in the lower half of the core that would give the current xenon concentration under equilibrium condition, $P_{TI}$: relative power in the upper half of the core that would give the current iodine concentration under equilibrium condition, and $P_{BI}$: relative power in the lower half of the core that would give the current iodine concentration under equilibrium condition.

The present invention predicts whether the core axial offset of the power distribution is increased or decreased after the current time based on the major axis of an ellipse, drawn by a xenon parameter and an iodine parameter, and the xenon parameter and the iodine parameter at the current time. This makes it possible to determine a future change of the core axial offset of the power distribution in a simple manner exclusively from a positional relation between the major axis of the ellipse and the plot point (the xenon parameter and the iodine parameter) on the ellipse at the current time. Therefore, by using a result of determining the future change of the core axial offset of the power distribution, it is possible to predict the change of the axial offset of the power distribution of the reactor for suppressing the xenon oscillation in the reactor.

Advantageously, the axial power distribution prediction method further includes: a margin calculating step of calculating a margin from a difference between the core axial offset of the current power distribution and an allowable value of the core axial offset after executing the axial offset calculation step; an allowable range determining step of determining whether the margin is smaller than a preset threshold value and whether the core axial offset of the power distribution after the current time makes a change in a direction with which the margin is decreased after executing the axial offset determining step; and an alarming step of alarming a need to operate a control rod if the margin is smaller than the preset threshold value and the core axial offset of the power distribution after the current time makes a change in the direction with which the margin is decreased.

Advantageously, the axial power distribution prediction device further includes: a margin calculating unit of calculating a margin from a difference between the core axial offset of the current power distribution and an allowable value of the core axial offset; an allowable range determining unit of determining whether the margin is smaller than a preset threshold value and whether the core axial offset of the power distribution after the current time makes a change in a direction with which the margin is decreased; and an alarming unit of alarming a need to operate a control rod if the margin is smaller than the preset threshold value and the core axial offset of the power distribution after the current time makes a change in the direction with which the margin is decreased.

Advantageously, the axial power distribution prediction method further includes: a margin calculating step of calculating a margin from a difference between the core axial offset of the current power distribution and an allowable value of the core axial offset after executing the axial offset calculation step; an allowable range determining step of determining whether the margin is smaller than a preset threshold value and whether the core axial offset of the power distribution after the current time makes a change in a direction with which the margin is decreased after executing the axial offset determining step; and an control rod moving step of moving a control rod in such a manner that the xenon parameter and the iodine parameter moves toward the major axis of the ellipse if the margin is smaller than the preset threshold value and the core axial offset of the power distribution after the current time makes a change in the direction with which the margin is decreased.

Advantageously, the axial power distribution prediction device further includes: a margin calculating unit of calculating a margin from a difference between the core axial offset of the current power distribution and an allowable value of the core axial offset; an allowable range determining unit of determining whether the margin is smaller than a preset threshold value and whether the core axial offset of the power distribution after the current time makes a change in a direction with which the margin is decreased; and an control rod moving unit of moving a control rod in such a manner that the xenon parameter and the iodine parameter moves toward the major axis of the ellipse if the margin is smaller than the preset threshold value and the core axial offset of the power distribution after the current time makes a change in the direction with which the margin is decreased.

Advantageous Effects of Invention

The present invention can predict a change of an axial offset of the power distribution of a reactor for suppressing a xenon oscillation in the reactor.

DESCRIPTION OF EMBODIMENTS

Exemplary embodiments of the present invention will be explained below in detail with reference to the accompanying drawings. The present invention is not limited to the following mode for carrying out the invention (hereinafter, "embodiment"). In addition, constituent elements in the following embodiments include those that can be easily assumed by persons skilled in the art or that are substantially equivalent, which are so-called "equivalents".

Figure 1:
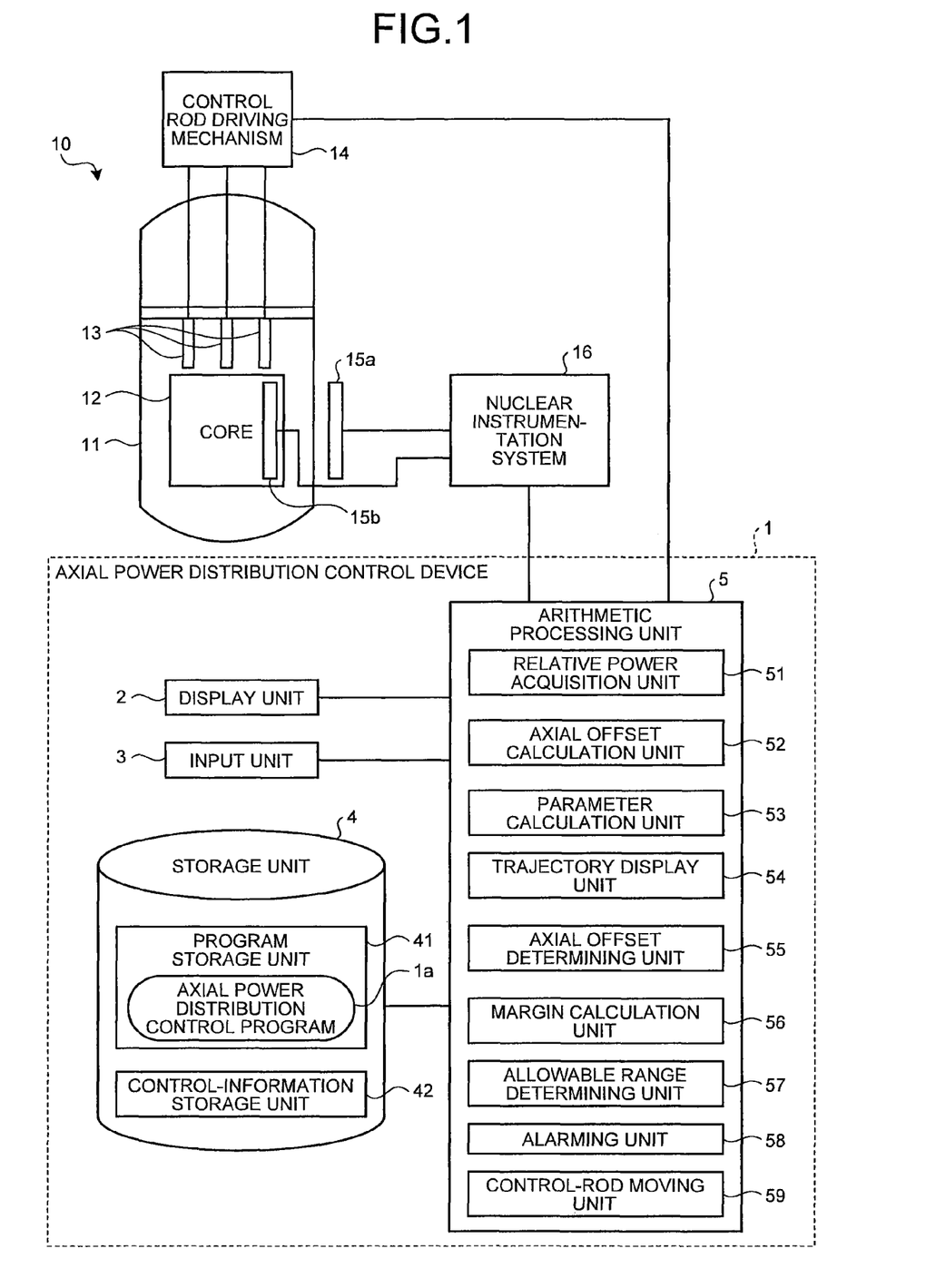
FIG. 1 is a schematic diagram of an overall configuration of an axial power distribution prediction device according to an embodiment of the present invention and a reactor.

FIG. 1 is a block diagram indicating overall structure of an axial power distribution control device 1 including an axial power distribution control program 1a of the present invention and a nuclear reactor 10 controlled by the axial power distribution control device 1. In this embodiment, the nuclear reactor 10 is a pressurized water reactor (PWR), comprising a pressure vessel 11, a reactor core 12 loaded in the pressure vessel 11, a control rod 13 which controls fission reaction in the reactor core 12, a control rod driving mechanism 14 which drives the control rod 13 vertically, an ex-core neutron flux detector 15a and a in-core neutron flux detector 15b located at corresponding upper and lower positions of the reactor core 12, and a nuclear instrumentation system 16 which calculates a relative power of the reactor core 12 based on detection readings on the ex-core neutron flux detector 15a and the in-core neutron flux detector 15b.

The reactor core 12 contains plural fuel rods as a nuclear fuel therein. The control rod 13 is driven by the control rod driving mechanism 14 which inserts or withdraws the control rod 13 from the reactor core 12. In this embodiment, "axial (ly)" corresponds to an axial direction of the reactor core 12, specifically a longitudinal direction of the fuel rods and a driving direction of the control rod 13. In this embodiment, axial xenon oscillation is described, because it is more commonly observed in an axial direction in the pressurized water reactor.

The control rod driving mechanism 14 is driven by the later-mentioned arithmetic processing unit 5 to drive the control rod 13 vertically. The ex-core neutron flux detectors 15a and 15b detect neutron fluxes released from upper and lower halves of the reactor core 12 to ex-core, respectively. The nuclear instrumentation system 16 calculates a relative power ($P_T$) of the upper half of the reactor core and a relative power ($P_B$) of the lower half of the reactor core, based on detection values on ex-core neutron flux detectors 15a and 15b. In this embodiment, a relative power is a value given by normalizing a rated power of the nuclear reactor 10 to 1.0.

The axial power distribution control device 1 of this embodiment, as shown in FIG. 1, mainly comprises a displaying unit 2 composed of a liquid crystal display, an display unit 3 composed of a keyboard, a mouse, etc., a storage unit 4 which stores an axial power distribution control program 1a of this embodiment and other data and an arithmetic processing unit 5 which controls the constitutive unit, acquires other data and performs arithmetic processing. The axial power distribution control device 1 also serves as an axial power distribution control prediction device that predicts the axial power distribution of the reactor 10 by executing the axial power distribution prediction method according to the present embodiment, as well as controls the axial power distribution of the reactor 10 to suppress the xenon oscillation.

The storage unit 4, included in the axial power distribution control device 1, comprising a hard disk and a random access memory (RAM), as shown in FIG. 1, further comprises a program storage unit 41 and a control-information storage unit 42. Each component of the storage unit 4 will be described in more detail. The program storage unit 41 is provided with the axial power distribution control program 1a of this embodiment installed therein. An axial power distribution prediction program for realizing the axial power distribution prediction method according to the present embodiment is incorporated in the axial power distribution control program 1a. The axial power distribution control program 1a is executed by the arithmetic processing unit 5 to realize an axial power distribution prediction for the reactor 10.

The control-information storage unit 42 stores an allowable range with regard to the axial offset of the current power distribution in the reactor core 12 of the nuclear reactor 10 (core axial offset of the power distribution). The allowable range is determined according to characteristics of the reactor core 12 in accordance with safety analysis of the reactor core 12 to reduce negative effects of xenon oscillation introduced as an axial power of the reactor core 12 changes and to ensure the safety of the reactor core 12.

The arithmetic processing unit 5 included in the an axial power distribution control device 1 comprises central processing unit (CPU). As shown in FIG. 1, the arithmetic processing unit 5 comprises a relative power acquisition unit 51, an axial offset calculation unit 52, a parameter calculation unit 53, a trajectory display unit 54, an axial offset determining unit 55, a margin calculation unit 56, and a allowable range determining unit 57, an alarming unit 58 and a control-rod moving unit 59. The arithmetic processing unit 5 predicts the axial power distribution of the reactor 10 by executing the axial power distribution control program 1a installed in the program storage unit 41.

That is, by the arithmetic processing unit 5 reading and executing the axial power distribution control program 1a, functions of the relative power acquisition unit 51, the axial offset calculation unit 52, the parameter calculation unit 53, the trajectory display unit 54, the axial offset determining unit 55, the margin calculation unit 56, and the allowable range determining unit 57, the alarming unit 58 and the control-rod moving unit 59 are realized. Meanwhile, in order for the axial power distribution control device 1 to realize a function of the axial power distribution prediction device according to the present embodiment, it suffices with at least the axial offset calculation unit 52, the parameter calculation unit 53, the axial offset determining unit 55.

Each component of the arithmetic processing unit 5 will be described in more detail. The relative power acquisition unit 51 acquires relative powers $P_T$ and $P_B$ in upper and lower regions of the reactor core 12. In this embodiment, the relative power acquisition unit 51 acquires relative powers $P_T$ and $P_B$ from the nuclear instrumentation system 16 at a specified time interval to provide them to the axial offset calculation unit 52.

The axial offset calculation unit 52 calculates the above-mentioned $AO_P$, an axial offset of the power distribution which would give the current xenon distribution under equilibrium condition (xenon-corresponding core axial offset of the power distribution), and an axial offset of the power distribution which would give the current iodine distribution under equilibrium condition (iodine-corresponding core axial offset of the power distribution).

The axial offset calculation unit 52 acquires relative powers $P_T$ and $P_B$ from the relative power acquisition unit 51 to calculate the core axial offset of the power distribution, the xenon-corresponding axial offset of the power distribution, and the iodine-corresponding axial offset of the power distribution from the following expressions (1) to (3) or (1)' to (3)', respectively. The expressions (1) to (3) are for calculating differences between the relative powers $P_T$ and $P_B$, relative powers $P_{TX}$ and $P_{BX}$ for the xenon concentration, and relative powers $P_{TI}$ and $P_{BI}$ for the iodine concentration, respectively, and the expressions (1)' to (3)' are for calculating values obtained by dividing the expressions (1) to (3) by a total core relative powers $P=(P_T+P_B)=(P_{TX}+P_{BX})=(P_{TI}+P_{BI})$.

Core axial offset of the power distribution:

$$(P_T-P_B)=\Delta I \quad \text{Expression (1)}$$

Xenon-corresponding core axial offset of the power distribution:

$$(P_{TX}-P_{BX}) \quad \text{Expression (2)}$$

Iodine-corresponding core axial offset of the power distribution:

$$(P_{TI}-P_{BI}) \quad \text{Expression (3)}$$

Core axial offset of the power distribution:

$$(P_T-P_B)/(P_T+P_B)=AO_P \quad \text{Expression (1)'}$$

Xenon-corresponding core axial offset of the power distribution:

$$(P_{TX}-P_{BX})/(P_{TX}+P_{BX})=AO_X \quad \text{Expression (2)'}$$

Iodine-corresponding core axial offset of the power distribution:

$$(P_{TI}-P_{BI})/(P_{TI}+P_{BI})=AO_I \quad \text{Expression (3)'},$$

where $P_{TX}$: relative power in the upper half of the core that would give the current xenon concentration under equilibrium condition, $P_{BX}$: relative power in the lower half of the core that would give the current xenon concentration under equilibrium condition, $P_{TI}$: relative power in the upper half of the core that would give the current iodine concentration under equilibrium condition, and $P_{BI}$: relative power in the lower half of the core that would give the current iodine concentration under equilibrium condition.

Here, methods for calculating $AO_X$ and $AO_I$ will be described in more detail. Changes in average xenon concentrations $X_T$ and $X_B$ in the upper half of the reactor core and the lower half of the reactor core are calculated according to the following Expressions (4) and (5), respectively, by the axial offset calculation unit 52.

$$dX_T/dt=y_X\Sigma_f\phi_0 P_T+\lambda_I I_T-(\sigma_a\phi_0 P_T+\lambda_X)X_T \quad \text{Expression (4)}$$

$$dX_B/dt=y_X\Sigma_f\phi_0 P_B+\lambda_I I_B-(\sigma_a\phi_0 P_B+\lambda_X)X_B \quad \text{Expression (5)}$$

Changes in average iodine concentrations $I_T$ and $I_B$ in the upper half of the reactor core and the lower half of the reactor core are calculated according to the following Expressions (6) and (7), respectively.

$$dI_T/dt=y_I\Sigma_f\phi_0 P_T-\lambda_I I_T \quad \text{Expression (6)}$$

$$dI_B/dt=y_I\Sigma_f\phi_0 P_B-\lambda_I I_B \quad \text{Expression (7), where}$$

$y_X$ and $y_I$: xenon and iodine yields from nuclear fission, $\lambda_X$ and $\lambda_I$: decay constant of xenon and iodine, $\Sigma_f$: macroscopic nuclear fission cross section, $\sigma_a$: microscopic absorption cross section of xenon, and $\phi_0$: mean neutron flux with rated power.

Average xenon concentrations $X_T$ and $X_B$, and average iodine concentrations $I_T$ and $I_B$ in the upper half of the reactor core and the lower half of the reactor core are calculated by integrating the above Expressions (4) to (7) by the axial offset calculation unit 52. Meanwhile, xenon concentrations $X_T^{Eq}$ and $X_B^{Eq}$ under equilibrium condition are calculated using relative powers $P_T^{Eq}$ and $P_B^{Eq}$ under equilibrium condition in the upper and lower halves of the reactor core using the following Expressions (8) and (9).

$$X_T^{Eq}=(y_I+y_X)\Sigma_f\phi_0 P_T^{Eq}/(\sigma_a\phi_0 P_T^{Eq}+\lambda_X) \quad \text{Expression (8)}$$

$$X_B^{Eq}=(y_I+y_X)\Sigma_f\phi_0 P_B^{Eq}/(\sigma_a\phi_0 P_B^{Eq}+\lambda_X) \quad \text{Expression (9)}$$

Iodine concentrations $I_T^{Eq}$ and $I_B^{Eq}$ under equilibrium condition in the upper and lower halves of the reactor core are calculated using relative powers $P_T^{Eq}$ and $P_B^{Eq}$ under equilibrium condition in the upper and lower halves of the reactor core using the following Expressions (10) and (11).

$$I_T^{Eq} = y_I \Sigma_f \phi_0 P_T^{Eq}/\lambda_I \quad \text{Expression (10)}$$

$$I_B^{Eq} = y_I \Sigma_f \phi_0 P_B^{Eq}/\lambda_I \quad \text{Expression (11)}$$

While xenon concentrations $X_T$ and $X_B$ in the upper and lower halves of the reactor core are given by the above Expressions (8) and (9), their corresponding power levels $P_{TX}$ and $P_{BX}$ are calculated by the axial offset calculation unit 52. Consequently, $AO_X$ can be determined by the following Expression (12).

$$AO_X = (P_{TX} - P_{BX})/(P_{TX} + P_{BX}) = (y_I + y_X) \Sigma_f (X_T - X_B)/\{(y_I + y_X) \Sigma_f (X_T - X_B) - 2\sigma_a X_T X_B\} \quad \text{Expression (12)}$$

Likewise, $AO_I$ can be calculated by the following Expression (13).

$$AO_I = (P_{TI} - P_{BI})/(P_{TI} + P_{BI}) = (I_T - I_B)/(I_T - I_B) \quad \text{Expression (13)}$$

The parameter calculation unit 53 calculates a parameter $DAO_{PX}$ and a parameter $DAO_{IX}$. Specifically, the parameter calculation unit 53 acquires $AO_P$, $AO_X$ and $AO_I$ from the axial offset calculation unit 52 to calculate a parameter $DAO_{PX}$ ($=AO_P - AO_X$) and a parameter $DAO_{IX}$ ($=AO_I - AO_X$). The parameter $DAO_{PX}$ is a xenon parameter represented by using a difference between $AO_P$ and $AO_X$, and the parameter $DAO_{IX}$ is an iodine parameter represented by using a difference between $AO_P$ and $AO_X$.

Although $DAO_{PX}$ and $DAO_{IX}$ are used as the xenon parameter and the iodine parameter, respectively, in the present embodiment, values obtained by multiplying $DAO_{PX}$ and $DAO_{IX}$ by the total relative output P of the reactor 10 can be used as the xenon parameter and the iodine parameter instead. In this case, the xenon parameter becomes $DAO_{PX} \times P = \{(P_T - P_B)/(P_T + P_B) - (P_{TX} - P_{BX})/(P_{TX} + P_{BX})\} \times P$, and the iodine parameter becomes $DAO_{IX} \times P = \{(P_{TI} - P_{BI})/(P_{TI} + P_{BI}) - (P_{TX} - P_{BX})/(P_{TX} + P_{BX})\} \times P$.

Because $P = (P_T + P_B) = (P_{TX} + P_{BX}) = (P_{TI} + P_{BI})$, the xenon parameter $DAO_{PX} \times P$ becomes $(P_T - P_B) - (P_{TX} - P_{BX})$, and the iodine parameter becomes $(P_{TI} - P_{BI}) - (P_{TX} - P_{BX})$. That is, the xenon parameter $DAO_{PX} \times P$ is a difference between the core axial offset of the power distribution $(P_T - P_B)$ and the xenon-corresponding core axial offset of the power distribution $(P_{TX} - P_{BX})$ (Expression (1)-Expression (2)). The iodine parameter $DAO_{IX} \times P$ is a difference between the iodine-corresponding core axial offset of the power distribution $(P_{TI} - P_{BI})$ and the xenon-corresponding core axial-direction output-distribution offset $(P_{TX} - P_{BX})$ (Expression (3)-Expression (2)). Because using $DAO_{PX} \times P$ as the xenon parameter and $DAO_{IX} \times P$ as the iodine parameter can give a generality with respect to the output change of the reactor 10, it is possible to monitor the reactor 10 on a steady basis even when the output of the reactor 10 is not constant.

In a case where load following operation changes power, a control method of this embodiment must be modified. Consequently, the calculation of the core axial offset of the power distribution ($AO_X$ or $\Delta I$) needs special consideration. First of all, because the above Expressions (4) and (5) include terms of products of powers $P_T$ and $P_B$ and xenon concentrations $X_T$ and $X_B$, a change in xenon concentration is nonlinear to the power of each region of a reactor core 12. Therefore, as shown in an expression of xenon concentration under equilibrium condition and power (the above Expressions (8) and (9)), xenon concentration under equilibrium condition is asymptotic to $(y_I + y_X) \Sigma_f / \sigma_a$ as a power increases.

If xenon concentration approaches the asymptotic value, a power obtained by inverse calculation from this value can be infinite value. For instance, such xenon concentration can be found when the power is reduced from a rated power to a partial power. Specifically, the core axial offset of the power distribution $AO_X$ or $\Delta I$ obtained using the above Expression (12) can be significantly large and can significantly deviate from a value obtained under actual operating conditions. The trajectory would be divergent in this case.

The above problem can be solved by defining the core axial offset of the power distribution $AO_X$ or $\Delta I$ as an axial offset of the axial power distribution which would give the current xenon offset ($X_r$) under equilibrium condition at the operating core power.

Xenon offset $X_r$ is defined by the following expression.

$$X_r = (X_T - X_B)/(X_T + X_B) \quad \text{Expression (14)}$$

S By substituting the above Expressions (8) and (9) for the above Expression (14), $$X_r = \lambda_X(P_T - P_B)/\{\lambda_X(P_T + P_B) + 2\sigma_a \phi_0 P_T P_B\} \quad \text{Expression (15)}$$

By definition, $P_T$ and $P_B$ are expressed by the following expressions.

$$P_T = P(1 + AO_X) \quad \text{Expression (16)}$$

$$P_B = P(1 - AO_X) \quad \text{Expression (17), where}$$

Here, P is the operating power which is obtained as measured value. By the above-mentioned definition, P is calculated from $P_{TX}$ and $P_{BX}$ obtained by inverse operation from xenon concentration, resulting in a difference from actual power.

By substituting the above Expressions (16) and (17) for the above Expression (15) to solve $AO_X$, the $AO_X$ is determined by the following Expression (18). Using the Expression (18), a control method of this embodiment can be applied under any operational conditions. $\Delta I$ can be obtained by multiplying the expression (18) by the total relative power P.

$$AO_X = \{-1 + \sqrt{(1 - 4AC)}\}/2A \quad \text{Expression (18), where}$$

$$A = \sigma_a \phi_0 P X_r / \lambda_X, \text{ and}$$

$$C = -X_r - A.$$

The trajectory display unit 54 displays a trajectory (plot trajectory) obtained by plotting the parameters ($DAO_{PX}$ and $DAO_{IX}$). Specifically, the trajectory display unit 54 acquires the parameters ($DAO_{PX}$ and $DAO_{IX}$) calculated by the parameter calculation unit 53, and displays a plot trajectory obtained by setting the parameter ($DAO_{PX}$) on the X-axis (horizontal axis that is one axis) and the parameter ($DAO_{IX}$) on the Y-axis (vertical axis that is the other axis) in the Cartesian coordinate system on the display unit 2. In this case, $AO_P$ in the expression (1)' is used for the core axial offset of the power distribution.

When $\Delta I$ shown in the expression (1) is used as the core axial offset of the power distribution, the trajectory display unit 54 displays a trajectory obtained by plotting values ($DAO_{PX} \times P$ and $DAO_{IX} \times P$) obtained by multiplying each of the parameters ($DAO_{PX}$ and $DAO_{IX}$) by the total relative power P (plot trajectory) on the display unit 2. Specifically, the trajectory display unit 54 acquires the parameters ($DAO_{PX} \times P$ and $DAO_{IX} \times P$) calculated by the parameter calculation unit 53, and displays a plot trajectory obtained by setting the parameter ($DAO_{PX} \times P$) on the X-axis (horizontal axis that is one axis) and the parameter ($DAO_{IX} \times P$) on the Y-axis (vertical axis that is the other axis) in the Cartesian coordinate system on the display unit 2. However, the method of displaying the trajectory is not limited to this method and, for example, a trajectory obtained by setting the parameter $DAO_{PX}$ or $DAO_{PX} \times P$ on the Y-axis and the parameter $DAO_{IX}$ or $DAO_{IX} \times P$ on the X-axis in the Cartesian coordinate system can be displayed instead.

It is known that a plot trajectory of parameters ($DAO_{PX}$, $DAO_{IX}$) or ($DAO_{PX} \times P$ and $DAO_{IX} \times P$) involves the characteristics in the following (1) to (5).

Figure 2:
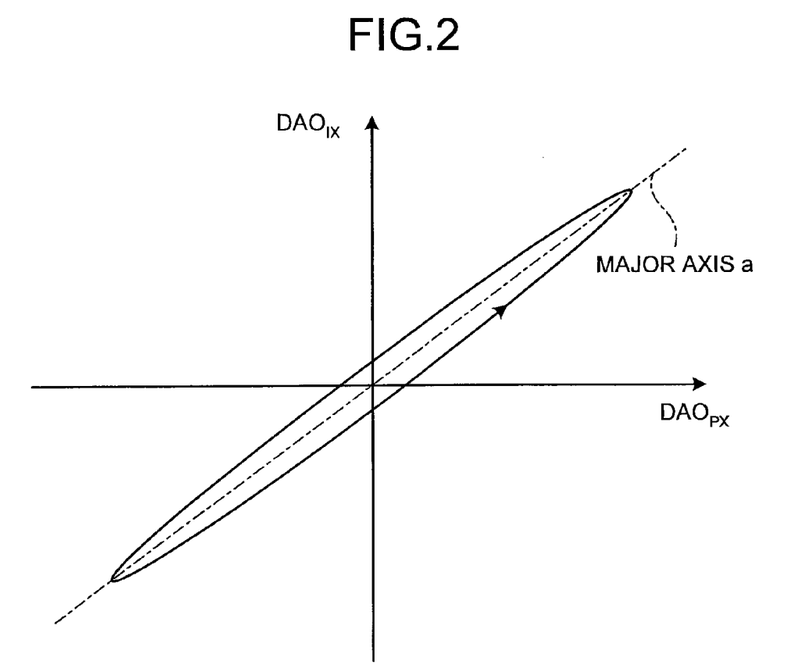
FIG. 2 depicts a plot trajectory when a xenon oscillation is stable in the embodiment.

(1) In a case where xenon oscillation is stable, a trajectory is expressed by a flat ellipse centering on the origin, as shown in FIG. 2. The major axis a of the ellipse, which lies in the first and third quadrants, inclines at a fixed angle (approximately 36 degrees) to a horizontal axis independent from the amplitude of a xenon oscillation.

(2) In the trajectory, the plot point always moves counterclockwise and around the origin with one-cycle of xenon oscillation (about 30 hours). Specifically, the larger the distance of the plot point is from the major axis a of the ellipse, the higher the speed of progress on ellipse becomes.

Figure 3:
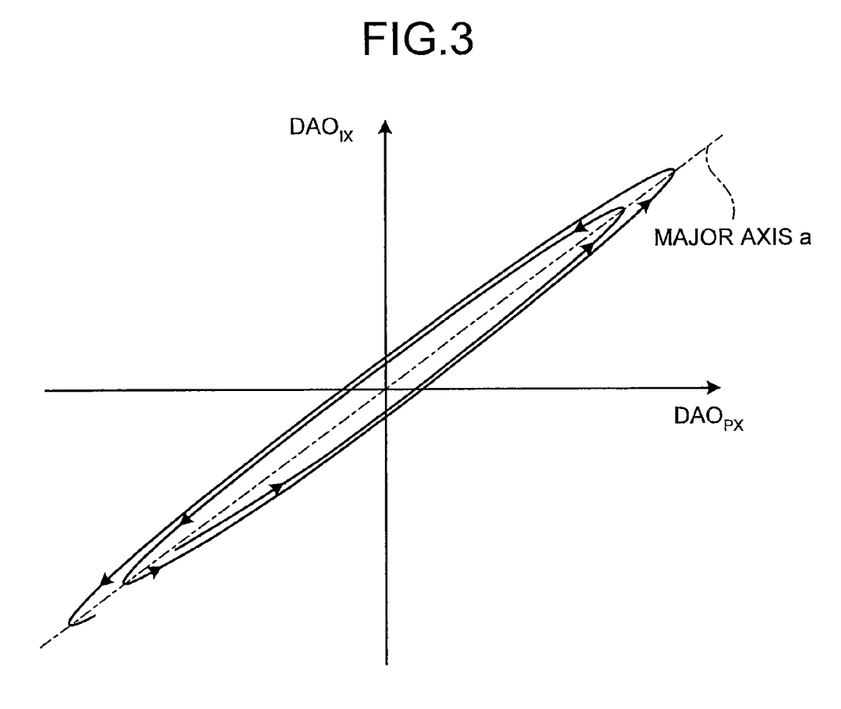
FIG. 3 depicts a plot trajectory when a xenon oscillation is divergent in the embodiment.

(3) In a case where xenon oscillation is divergent, an elliptic spiral becomes larger as shown in FIG. 3, and if xenon oscillation is convergent, an elliptic spiral becomes smaller and converges on the origin.

(4) When the control rod 13 is inserted into the reactor core 12 stepwise, the trajectory moves to the negative side in parallel with the horizontal axis, and when the control rod 13 is withdrawn, the trajectory moves to the positive side in parallel with the horizontal axis. After the control rod 13 stops, the trajectory will be formed as another ellipse having characteristics of the above (1) to (3).

(5) When the trajectory stays at the origin (under the condition of $AO_P = AO_X = AO_I$), the xenon oscillation is suppressed.

The axial offset determining unit 55 predicts whether the core axial offset of the power distribution ($AO_P$ or $\Delta I$) is increased or decreased from the current time on, based on the major axis of the ellipse, drawn by the xenon parameter and the iodine parameter (parameters ($DAO_{PX}$ and $DAO_{IX}$) or ($DAO_{PX} \times P$ or $DAO_{IX} \times P$)) calculated by the parameter calculation unit 53, and the xenon parameter and the iodine parameter at the current time by executing the axial power distribution prediction method according to the present embodiment. This method is explained later.

The margin calculation unit 56 calculates a margin from a difference between the core axial offset of the power distribution at the current time and an allowable value of the core axial offset of the power distribution. The allowable range determining unit 57 determines whether the margin obtained based on the allowable range (allowable value) for the core axial offset distribution by the margin calculation unit 56 is smaller than a preset threshold value and whether the core axial offset of the power distribution after the current time makes a change in a direction with which the margin is decreased. When it is predicted that the core axial offset of the power distribution from the current time on makes a change in the direction with which the margin is decreased, the allowable range determining unit 57 outputs a signal indicating the fact (warning signal) to at least one of the control-rod moving unit 59 and the alarming unit 58.

When it is predicted that the core axial offset of the power distribution from the current time on makes a change in the direction with which the margin is decreased, the alarming unit 58 issues a warning of the fact. In the present embodiment, upon acquiring the output signal from the allowable range determining unit 57 indicating that it is predicted that the core axial offset of the power distribution from the current time on makes a change in the direction with which the margin is decreased, for example, the alarming unit 58 alarms an operator of the reactor 10 of the fact with an audio or a light. When using the light, for example, the alarming unit 58 turns on or flashes a warning lamp, displays a warning on the display unit 2, or changes a color of a display screen of the display unit to a different color.

When a warning is issued by the alarming unit 58, the operator can perform an operation to move the control rod 13 via the input unit 3. In this case, the control-rod moving unit 59 is configured to acquire operation information (moving direction and moving amount) input from the input unit 3 and output a driving signal corresponding to the operation to the control rod driving mechanism 14. However, the method of issuing the warning by the alarming unit 58 is not limited to this configuration. In the present embodiment, because it can be found that the core axial offset of the power distribution in the future makes a change in the direction with which the margin is decreased, for example, the allowable range determining unit 57 may obtain a movement direction of the control rod 13 required to increase the margin and outputs the obtained movement direction to the alarming unit 58, and the alarming unit 58 alarms an operator of the movement direction of the control rod 13 based on this output.

The control-rod moving unit 59 performs a movement control of inserting, drawing, and stopping the control rod 13 with respect to the core by controlling the control rod driving mechanism 14. When the core axial offset of the power distribution from the current time on makes a change in the direction with which the margin is decreased, the operator performs an operation to move the control rod 13 via the input unit 3 in such a manner that the margin is increased. With this configuration, because the axial power distribution in the reactor 10 can be controlled before the xenon oscillation is increased in magnitude, it is possible to suppress the xenon oscillation in a rapid manner. Alternatively, the control-rod moving unit 59 can be configured to move the control rod 13 upon receiving the signal indicating that it is predicted that the core axial offset of the power distribution from the current time on makes a change in the direction with which the margin is decreased.

In this embodiment, the control rod 13 may be moved so that a plot point of the ellipse trajectory indicated on the displaying unit 2, that is, the parameters ($DAO_{PX}$ and $DAO_{IX}$) of the reactor 10 at a time later than the current time, is guided to the major axis of the ellipse. In fact, this method for operating a control rod is invented by this inventor based on unconventional findings. This inventor found that $AO_P$ or $\Delta I$ is constant in case of a plot point lying on the major axis of the ellipse trajectory.

Figure 4:
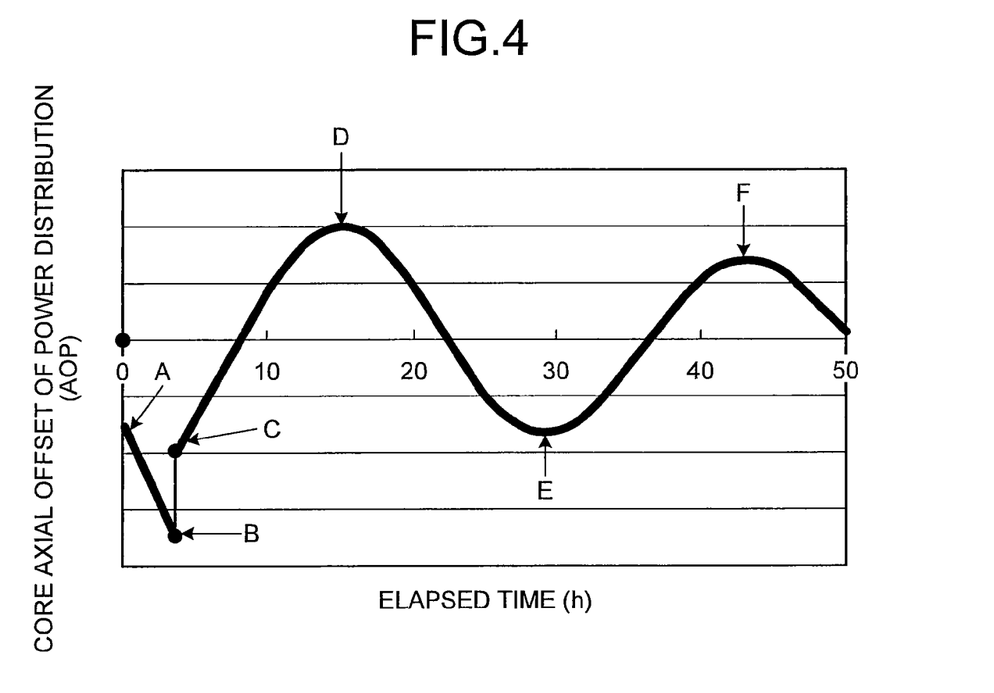
FIG. 4 is a graph of an AOp during a xenon oscillation in the embodiment.
Figure 5:
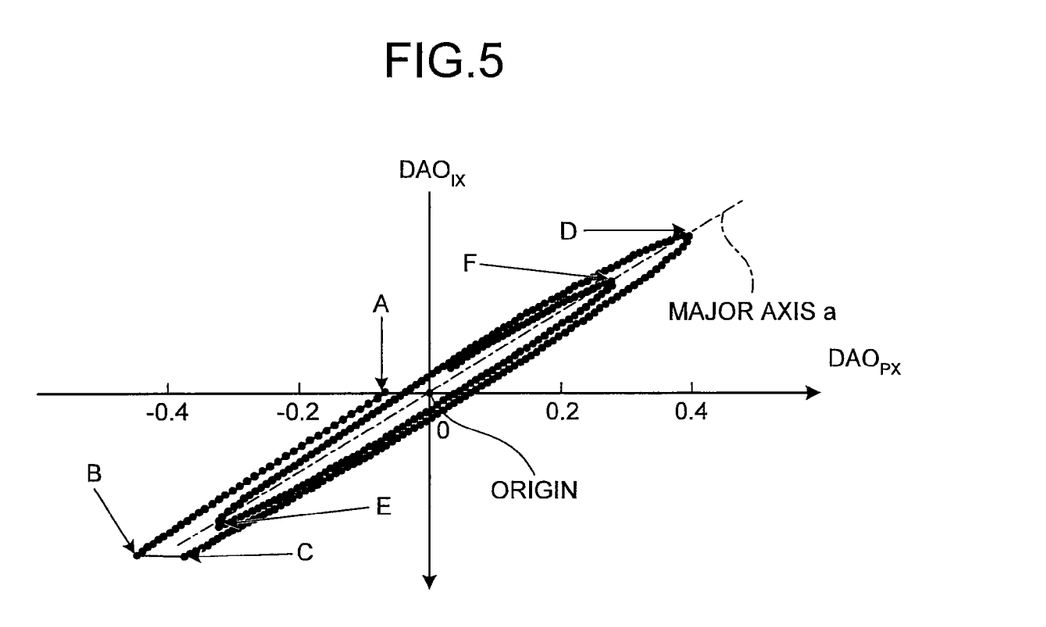
FIG. 5 depicts a plot trajectory of ($DAO_{PX}$, $DAO_{IX}$) corresponding to FIG. 4.

The above findings will be described in more detail with reference to the drawings. In the following explanations, $AO_P$ is used as the core axial offset distribution. FIG. 4 is a graph showing $AO_P$ of the reactor core 12 when xenon oscillation is induced by inserting the control rod 13 into the reactor core 12 (origin to point A), maintaining the state for a certain period of time (points A to B) and withdrawing the control rod 13 (points B to C) to give disturbance. FIG. 5 is a graph showing a plot trajectory of parameters ($DAO_{PX}$, $DAO_{IX}$) corresponding to FIG. 4.

As shown in FIG. 4, when $AO_P$ oscillates with a predetermined cycle which can produce xenon oscillation, its rate of change or tangential inclination is 0 at poles (D, E, F). Meanwhile, these poles (D, E, F) lie on the major axis of an ellipse formed by the trajectory of said parameters in FIG. 5. In a case where a plot point lies on the major axis of an ellipse formed by the trajectory of said parameters, $AO_P$ is constant. When a plot point deviates from the major axis a, $AO_P$ can constantly change, indicating a growing xenon oscillation.

The parameter $DAO_{PX}$ is defined as ($AO_P - AO_X$), and the major axis a and minor axis of an ellipse formed by the trajectory of said parameters is proportional to $AO_P$ (expressed as amplitude in FIG. 4). Consequently, from the above characteristic (4), the major axis a of the ellipse trajectory is shortened to reduce $AO_P$, only by guiding a plot point to the major axis a of an ellipse formed by the trajectory of said parameters. Soon after the trajectory progresses, an ellipse formed by the trajectory of said parameters is drawn with reduced major axis and minor axis, thereby suppressing xenon oscillation.

In a case where the control rod 13 is moved, a plot point is preferably moved to the major axis, but may be as close as possible. As a result, since the rate of change in $AO_P$ becomes a minimum level, it is possible to suppress xenon oscillation. As long as no other disturbance is observed, xenon oscillation develops with smaller amplitude after the plot point is moved, thereby making the plot point gradually approach the origin and inevitably suppressing xenon oscillation.

In this embodiment, the control rod 13 is manually operated by an operator, but this invention is not limited thereto. The control rod moving unit 56 may automatically control the control rod 13. In this case, the control-rod moving unit 59 calculates a distance from the current plot point to the major axis a of the elliptical trajectory in the X-axis direction, upon acquiring the signal from the allowable range determining unit 57 indicating a prediction that the core axial offset after the current time changes to the direction with which the margin is decreased. Based on the distance, a movement volume of the control rod 13 is calculated and an operation signal of inserting the control rod 13 by the steps is given to the control rod driving mechanism 14. Also in this case, the control-rod moving unit 56 performs a movement control of the control rod in such a manner that the plot point is induced toward the major axis of the ellipse. Since the relationship between motion steps of the control rod 13 and motion steps of a plot point varies with time, arithmetic processing is executed in accordance with conditions corresponding thereto.

In the axial power distribution prediction method according to the present embodiment, it is predicted whether the core axial offset ($AO_P$ or $\Delta I$) is increased or decreased in the future from the relation between the xenon parameter and the iodine parameter (parameters ($DAO_{PX}$ and $DAO_{IX}$) or ($DAO_{PX} \times P$ or $DAO_{IX} \times P$)) at the current time and the major axis a of the elliptical trajectory. This prediction is explained with reference to FIG. 6. In the following explanations, $\Delta I$ is used as the core axial offset of the power distribution and $DAO_{PX} \times P$ and $DAO_{IX} \times P$ are used as the xenon parameter and the iodine parameter, respectively.

An elliptical trajectory drawn by the xenon parameter $DAO_{PX} \times P$ and the iodine parameter $DAO_{IX} \times P$ is set to T, and N is set to values (plot point) of the xenon parameter and the iodine parameter at the current time. ($DAO_{PX} \times P$ and $DAO_{IX} \times P$) makes a rotation around the origin O in a direction of an arrow in FIG. 6 with time. FIG. 7 depicts a temporal change of $\Delta I$, where G and H shown in FIG. 7 correspond to G and H shown in FIG. 6, respectively.

Figure 6:
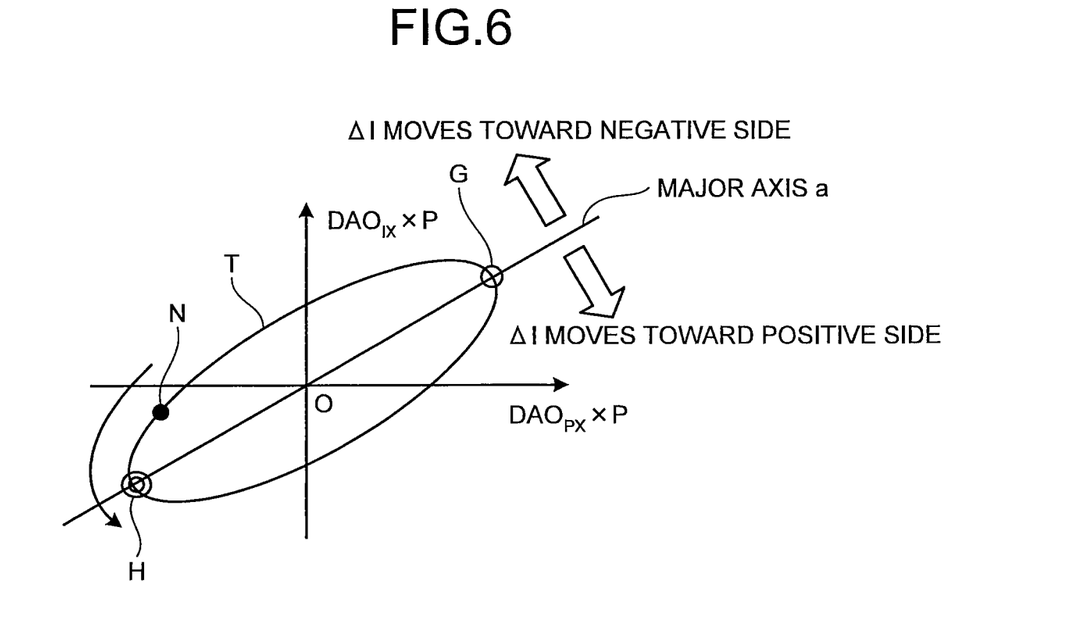
FIG. 6 is a schematic diagram of an elliptical trajectory with a xenon oscillation occurred.
Figure 7:
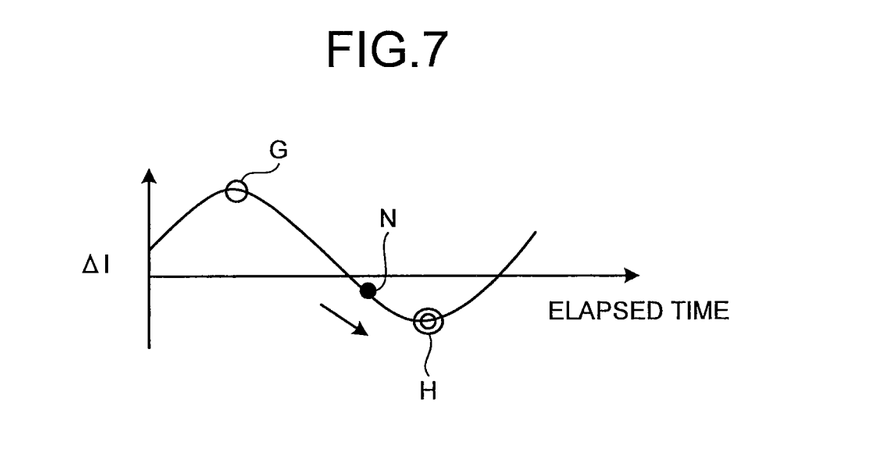
FIG. 7 is a schematic diagram of a temporal change of $\Delta I$ corresponding to the xenon oscillation shown in FIG. 6.

As is clear from the correspondence relation between FIG. 6 and FIG. 7, as the plot point moves from G to H of the elliptical trajectory T, $\Delta I$ shown in FIG. 7 is decreased, that is, $\Delta I$ moves to the negative side. On the other hand, as the plot point moves from H to G of the elliptical trajectory, $\Delta I$ shown in FIG. 7 is increased, that is, $\Delta I$ moves to the positive side. This means that $\Delta I$ is decreased when the plot point N at the current time is on the positive side of the vertical axis (positive side of the iodine parameter $DAO_{IX} \times P$) from the major axis a, and $\Delta I$ is increased when the plot point N at the current time is on the negative side of the vertical axis (negative side of the iodine parameter $DAO_{IX} \times P$) from the major axis a. Therefore, by comparing the plot point N at the current time with the major axis a, whether the core axial offset of the power distribution $\Delta I$ is increased or decreased after the current time can be predicted. In this manner, with the axial power distribution prediction method according to the present embodiment, the core axial offset of the power distribution $\Delta I$ in the future can be predicted in a simple manner.

Figure 8:
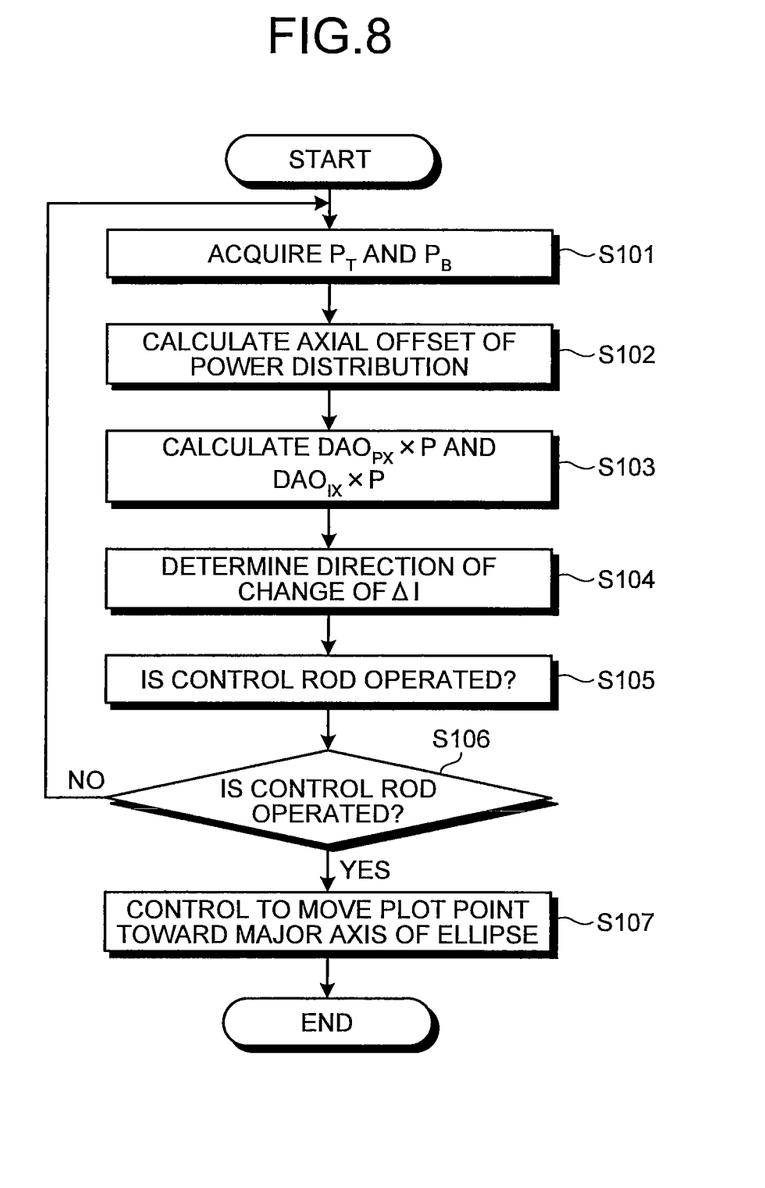
FIG. 8 is a flowchart of a procedure of an axial power distribution prediction method according to the embodiment.
Figure 9:
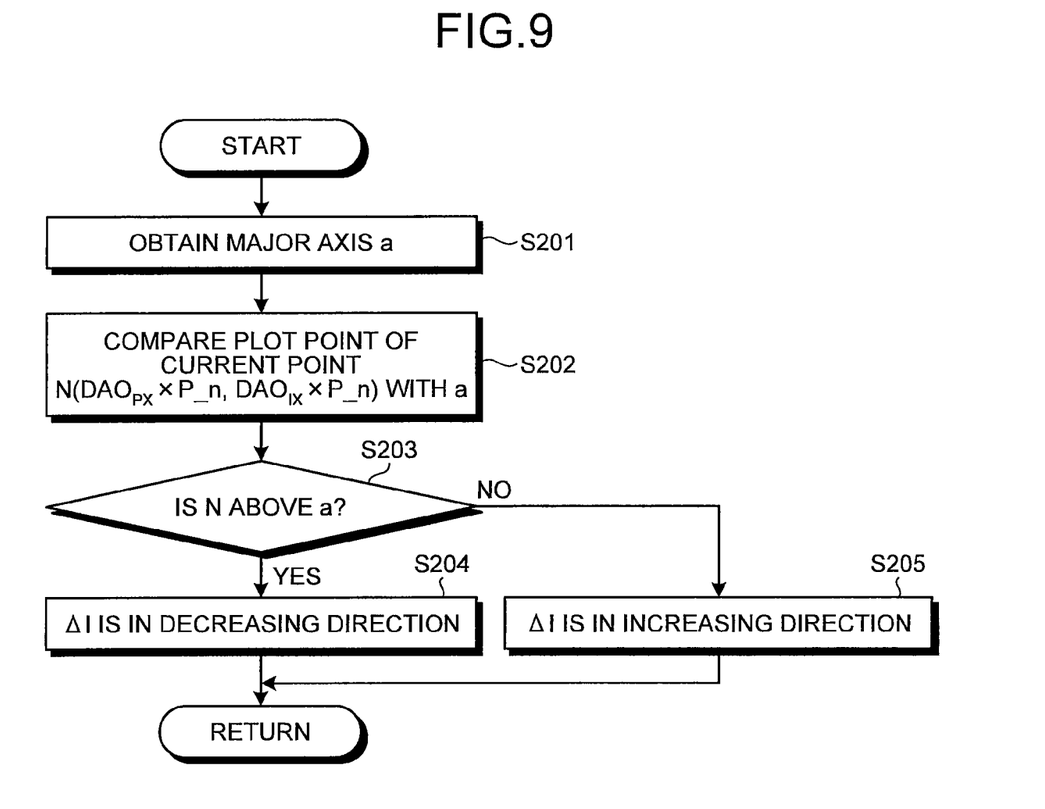
FIG. 9 is a flowchart of a procedure of the axial power distribution prediction method according to the embodiment.

The axial power distribution prediction method according to the present embodiment is explained with reference to FIGS. 8 and 9. The axial power distribution prediction method according to the present embodiment is realized by the axial power distribution control device 1 executing the axial power distribution control program 1a according to the present embodiment. When controlling a pressurized water reactor, at Step S101, the relative power acquisition unit 51 of the axial power distribution control device 1 acquires the relative power $P_T$ of the upper half of the core and the relative power $P_B$ of the lower half of the core from the nuclear instrumentation system 16.

Thereafter, the process proceeds to Step S102, and the axial offset calculation unit 52 calculates the axial offset of the power distribution of the reactor 10, more specifically, the xenon-corresponding core axial offset of the power distribution, the iodine-corresponding core axial offset of the power distribution, and the core axial offset of the power distribution, based on $P_T$ and $P_T$ acquired by the relative power acquisition unit 51 by using the relational expressions (1) to (3) or (1)' to (3)' (axial offset of the power distribution calculating step). At Step S103, the parameter calculation unit 53 calculates the xenon parameter $DAO_{PX} \times P$ and the iodine parameter $DAO_{IX} \times P$ from the xenon-corresponding core axial offset of the power distribution, the iodine-corresponding core axial offset of the power distribution, and the core axial offset of the power distribution calculated by the axial offset calculation unit 52 (parameter calculation step).

Subsequently, the process proceeds to Step S104, and the axial offset determining unit 55 predicts whether the core axial offset of the power distribution $\Delta I$ is increased or decreased after the current time, based on the major axis a of the ellipse drawn by the xenon parameter $DAO_{PX} \times P$ and the iodine parameter $DAO_{IX} \times P$ (see FIG. 6) and the xenon parameter and the iodine parameter at the current time, that is, the plot point N shown in FIG. 6 (axial offset determining step). The trajectory display unit 54 may display the ellipse drawn by the xenon parameter $DAO_{PX} \times P$ and the iodine parameter $DAO_{IX} \times P$ on the display unit 2. The axial offset determining step is explained next with reference to FIG. 9.

At Step S201 of the axial offset determining step, the axial offset determining unit 55 obtains the major axis a of the ellipse drawn by the xenon parameter $DAO_{PX} \times P$ and the iodine parameter $DAO_{IX} \times P$ (for example, a linear expression representing the major axis a). The major axis a can also be obtained from the elliptical trajectory by the xenon parameter $DAO_{PX} \times P$ and the iodine parameter $DAO_{IX} \times P$. Furthermore, because the major axis a is a line that passes the origin and is inclined at a predetermined angle (around 36 degrees) to the horizontal axis, a line passing the origin with a slope K which is tan $(DAO_{PX} \times P / DAO_{IX} \times P) = \theta$ may be stored in the storage unit 4 as the linear expression representing the major axis a. At the axial offset determining step, the axial offset determining unit 55 then reads out the linear expression representing the major axis a from the storage unit 4 as appropriate, and use it to predict the core axial offset of the power distribution.

Thereafter, the process proceeds to Step S202, and the axial offset determining unit 55 compares the plot point N ($DAO_{PX} \times P\_n$, $DAO_{IX} \times P\_n$) at the current time with the major axis a. For example, the axial offset determining unit 55 compares a value Y obtained by substituting $DAO_{PX} \times P\_n$ of the plot point N at the current time for $DAO_{PX} \times P$ of an expression representing the major axis a $DAO_{PX} \times P = K \times DAO_{PX} \times P$ with $DAO_{PX} \times P\_n$ of the plot point N at the current time. If a result of the comparison is $DAO_{PX} \times P\_n > Y$, the axial offset determining unit 55 determines that N is above a, that is, N is located at the positive side of the vertical axis. On the other hand, if the result of the comparison is $DAO_{PX} \times P\_n < Y$, the axial offset determining unit 55 determines that N is below a, that is, N is located at the negative side of the vertical axis. If the result of the comparison is $DAO_{PX} \times P\_n = Y$, the axial offset determining unit 55 cannot determine whether N is above a or below a, because the plot point N at the current time is on the major axis a. Because the plot point on the elliptical trajectory moves around the origin with time, in case of $DAO_{PX} \times P\_n = Y$, for example, the axial offset determining unit 55 performs a determination at Step S203 in a predetermined time from the current time. This makes it possible to determine whether N is above a or below a, because the plot point moves from the major axis a.

When a result of the determination is "YES" at Step S203, that is, when the axial offset determining unit 55 determines that N is above a, the process proceeds to Step S204. At Step S204, the axial offset determining unit 55 determines that the core axial offset of the power distribution ΔI is in a direction of being decreased from the current time on. On the other hand, when the result of the determination is "NO" at Step S203, that is, when the axial offset determining unit 55 determines that N is below a, the process proceeds to Step S205. At Step S205, the axial offset determining unit 55 determines that the core axial offset of the power distribution ΔI is in a direction of being increased from the current time on. With this configuration, because the direction of change of the core axial offset of the power distribution ΔI is predicted, the axial offset determining step is completed. That is, Step S104 shown in FIG. 1 is completed. The alarming unit 58 can be configured to display a prediction result obtained at the axial offset determining step, for example, on the display unit. This makes it possible for an operator of the reactor 10 to confirm the state of the core.

Thereafter, the process proceeds to Step S105, and the margin calculation unit 56 calculates a margin M from a difference between the core axial offset ΔI at the current time and an allowable value of the core axial offset of the power distribution. An allowable range for securing the safety of the reactor 10 is taken to be equal to or higher than ΔI_low (lower limit allowable value) and equal to or lower than ΔI_high (upper limit allowable value). The margin M is defined by the following expressions (19) and (20) using the core axial offset of the power distribution ΔI at the current time and the lower limit allowable value ΔI_low or the upper limit allowable value ΔI_high.

$$M\_low = \Delta I - \Delta I\_low \quad \text{Expression (19)}$$

$$M\_high = \Delta I - \Delta I\_high \quad \text{Expression (20)}$$

As is clear from the expressions (19) and (20), because the margin M is a difference between the core axial offset of the power distribution ΔI at the current time and the lower limit allowable value ΔI_low or the upper limit allowable value ΔI_high, as the margin M is decreased, the core axial offset of the power distribution ΔI approaches the lower limit allowable value ΔI_low or the upper limit allowable value ΔI_high, which requires a movement of the control rod 13. At Step S106, it is determined whether to move the control rod 13. In this case, for example, the allowable range determining unit 57 determines whether at least one of the margins M_low and M_high obtained by the margin calculation unit 56 is smaller than a preset threshold value Nc and whether the core axial offset of the power distribution ΔI at the current time makes a change in a direction with which the margin M is decreased. The preset threshold value Mc is for determining whether to move the control rod 13, and when at least one of the margins M_low and M_high is smaller than the threshold value Mc, it is determined to move the control rod 13.

When at least one of the margins M_low and M_high is smaller than the preset threshold value Mc, it is required to move the control rod 13. However, in the example shown in FIG. 6, when the margin M_high=ΔI-ΔI_high at the plot point N at the current time is smaller than the threshold value Mc, the core axial offset of the power distribution ΔI after the current time is decreased because the plot point N is above the major axis a. That is, the margin M_high is increased as it is, and becomes larger than the threshold value Mc, so that it is not necessary to make an operation to move the control rod 13. Similarly, when the margin M_low=ΔI-ΔI_low is smaller than the threshold value Mc, if the plot point N is below the major axis a, the core axial offset of the power distribution ΔI after the current time is increased. As a result, the margin M_low is increased as it is, and becomes larger than the threshold value Mc, so that it is not necessary to make any operation to move the control rod 13.

In this manner, in the axial power distribution prediction method according to the present embodiment, whether to operate the control rod 13 is determined based on the margin M and a change of the margin M due to the ΔI after the current time. Because this eliminates an unnecessary operation of the control rod 13, it is possible to realize a stable operation of the reactor 10 by suppressing the xenon oscillation in a rapid manner. Whether the core axial offset of the power distribution ΔI after the current time is changed in a direction of decreasing the margin M is determined in such a manner shown in Table 1. Whether the core axial offset of the power distribution ΔI after the current time is changed in a direction of decreasing the margin M can be determined by the allowable range determining unit 57, or alternatively, by an operator of the reactor 10. When the change of the core axial offset of the power distribution ΔI after the current time is determined by the allowable range determining unit 57, contents of Table 1 is made into a data table so that the data table is stored in the storage unit 4, and the allowable range determining unit 57 determines whether it is necessary to operate the control rod 13 by giving to the data table a result of comparison between the margin M and the threshold value Mc and a result of comparison between the plot point N and the major axis a.

TABLE 1

|  | Plot point N > a | Plot point N < a |
| --- | --- | --- |
| M_low < Mc | Require operation of control rod | Not require operation of control rod |
| M_high < Mc | Not require operation of control rod | Require operation of control rod |

When a result of the determination is "NO" at Step S106, that is, when at least one of the margins M_low and M_high is larger than the preset threshold value Nc or the core axial offset of the power distribution ΔI after the current time is changed in a direction of increasing the margin M, the control returns to Step S101, and the axial power distribution control device 1 continues to monitor the reactor 10. On the other hand, when the result of the determination is "YES" at Step S106, that is, when at least one of the margins M_low and M_high is smaller than the preset threshold value Nc and the core axial offset of the power distribution ΔI after the current time is changed in the direction of decreasing the margin M, it is required to operate the control rod 13, and thus the process proceeds to Step S107.

At Step S107, an operator performs an operation for moving the control rod 13 from the input unit 3 (control-rod moving step). When the operator operates the control rod 13, the alarming unit 58 alarms the operator of a fact that an operation is required to move the control rod 13 with an audio or a picture before the control-rod moving step. With this configuration, the operator can securely confirm the fact that an operation is required to move the control rod 13.

Upon moving the control rod 13, in the present embodiment, the operator operates the control rod 13 in such a manner that the latest plot point of the parameters ($DAO_{PX} \times P$ and $DAO_{IX} \times P$) moves toward the major axis a of the elliptical trajectory. That is, the control rod 13 is operated such that the parameters ($DAO_{PX} \times P$ and $DAO_{IX} \times P$) after the current time are moved toward the major axis a of the elliptical trajectory. When an operation of the control rod 13 is required, the trajectory display unit 54 displays the elliptical trajectory of the parameters ($DAO_{PX} \times P$ and $DAO_{IX} \times P$) on the display unit 2. With this configuration, it is possible to support the operator to perform the operation.

With this arrangement, because the change rate of the core axial offset of the power distribution ΔI is minimized as long as there is no other disturbance, it is possible to suppress the xenon oscillation. In addition, because the xenon oscillation makes a progress in a direction with which the amplitude is decreased, even if it is left unattended after that, the plot point approaches the origin O, and the xenon oscillation progresses toward a direction of being naturally extinguished. After performing the movement control of the control rod 13, the process returns to START, and monitoring the operation state of the reactor 10 is continued.

When controlling the control rod 13 in an automatic manner by the control-rod moving unit 59, at Step S106, the allowable range determining unit 57 outputs a determination result indicating that an operation of the control rod 13 is necessary to the control-rod moving unit 59. Upon receiving this output, the control-rod moving unit 59 calculates a distance in the X-axis direction (horizontal axis, $DAO_{PX} \times P$ in FIG. 6) from the current plot point N to the major axis a of the elliptical trajectory. The control-rod moving unit 59 then calculates a movement amount of the control rod 13 based on the distance, and outputs to the control rod driving mechanism an operation signal for inserting the control rod 13 by the movement amount.

As described above, according to the present embodiment,

1. It is possible to determine a future change of the core axial offset of the power distribution in a simple manner exclusively from a positional relation between the major axis of the ellipse, drawn by the xenon parameter and the iodine parameter, and the xenon parameter and the iodine parameter at the current time (that is, the plot point on the ellipse). As a result, the change of the axial offset of the power distribution of the reactor can be predicted in a simple manner for suppressing the xenon oscillation in the reactor.

2. The xenon oscillation can be controlled in a simultaneous manner simply by controlling the axial power distribution in the reactor 10, and therefore, it is possible to suppress the xenon oscillation to a considerably low level in a rapid manner and to ensure the safety on the control of the reactor.

3. The movement timing and the movement amount of the control rod 13 is visually confirmed in an easy manner, thus making it possible to operate the control rod 13 in an easy and secure manner, and to make a control plan considerably simple and clear.

Industrial Applicability

As described above, the axial power distribution prediction method and the axial power distribution prediction device according to the present invention are useful for prediction of a future change of a core axial offset of the power distribution.

REFERENCE SIGNS LIST

1 axial power distribution control device
1a axial power distribution control program
2 display unit
3 input unit
4 storage unit
5 arithmetic processing unit
10 reactor
11 pressure vessel
12 core
13 control rod
14 control rod driving mechanism
15a ex-core neutron-flux detector
15b in-core neutron-flux detector
16 nuclear instrumentation system
41 program storage unit
42 control-information storage unit
51 relative power acquisition unit
52 axial offset calculation unit
53 parameter calculation unit
54 trajectory display unit
55 axial offset determining unit
56 margin calculation unit
57 allowable range determining unit
58 alarming unit
59 control-rod moving unit

The invention claimed is:

1. An axial power distribution prediction device, comprising:
an axial offset calculation unit that calculates an axial offset of a current power distribution ($AO_P$), an axial offset of the power distribution which would give a current xenon distribution under equilibrium condition (xenon-corresponding axial offset: $AO_X$), and an axial offset of the power distribution which would give a current iodine distribution under equilibrium condition (iodine-corresponding axial offset: $AO_I$), using the following expressions (1) to (3) or (1)' to (3)', respectively:

$$AO_P = (P_T - P_B) \quad \text{Expression (1)}$$

$$AO_X = (P_{TX} - P_{BX}) \quad \text{Expression (2)}$$

$$AO_I = (P_{TI} - P_{BI}) \quad \text{Expression (3)}$$

$$AO_P = (P_T - P_B)/(P_T + P_B) \quad \text{Expression (1)'}$$

$$AO_X = (P_{TX} - P_{BX})/(P_{TX} + P_{BX}) \quad \text{Expression (2)'}$$

$$AO_I = (P_{TI} - P_{BI})/(P_{TI} + P_{BI}) \quad \text{Expression (3)', where}$$

$P_{TX}$: relative power in an upper half of a core that would we a current xenon concentration under equilibrium condition, $P_{BX}$: relative power in a lower half of the core that would give the current xenon concentration under equilibrium condition, $P_{TI}$: relative power in the upper half of the core that would give a current iodine concentration under equilibrium condition, and $P_{BI}$: relative power in the lower half of the core that would give the current iodine concentration under equilibrium condition, based on a relative power ($P_T$) in the upper half of the nuclear reactor core and a relative power ($P_B$) in the lower half of the nuclear reactor core;

a parameter calculating unit that calculates a xenon parameter represented by using a difference between $AO_P$ and $AO_X$ during an operation of the reactor and an iodine parameter represented by using a difference between $AO_I$ and $AO_X$ during the operation of the reactor;

a trajectory display unit that acquires the xenon parameter and the iodine parameter calculated by the parameter calculating unit, and generates an ellipse-shaped plot trajectory by setting the xenon parameter as x-coordinate and the iodine parameter as y-coordinate in a Cartesian coordinate system on a display unit; and an axial offset determining unit that predicts whether a core axial offset of the power distribution after a current time is increased or decreased, by drawing a major axis in the ellipse-shaped plot trajectory and generating a plot point using a xenon parameter and an iodine parameter at the current time, wherein the core axial offset of the power distribution after the current time is determined to be decreased when the plot point is located above the major axis and the core axial offset of the power distribution after the current time is determined to be increased when the plot point is located below the major axis.

2. The axial power distribution prediction device according to claim 1, further comprising:

a margin calculating unit that calculates a margin from a difference between the core axial offset of the current power distribution and an allowable value of the core axial offset;

an allowable range determining unit that determines whether the margin is smaller than a preset threshold value and whether the core axial offset of the power distribution after the current time is predicted to make a change in a direction with which the margin is decreased; and an alarming unit that alerts a need to operate a control rod if the margin is smaller than the preset threshold value and the core axial offset of the power distribution after the current time is predicted to make a change in the direction with which the margin is decreased.

3. The axial power distribution prediction device according to claim 1, further comprising:

a margin calculating unit that calculates a margin from a difference between the core axial offset of the current power distribution and an allowable value of the core axial offset;

an allowable range determining unit that determines whether the margin is smaller than a preset threshold value and whether the core axial offset of the power distribution after the current time is predicted to make a change in a direction with which the margin is decreased; and an control rod moving unit that moves a control rod in such a manner that the xenon parameter and the iodine parameter moves toward the major axis of the ellipse if the margin is smaller than the preset threshold value and the core axial offset of the power distribution after the current time is predicted to make a change in the direction with which the margin is decreased.

* * * * *